(12) United States Patent
Balling

(10) Patent No.: US 7,035,710 B2
(45) Date of Patent: Apr. 25, 2006

(54) DEVICE FOR AUTOMATING AND/OR CONTROLLING OF MACHINE TOOLS OR PRODUCTION MACHINES

(75) Inventor: Gerold Balling, Erlangen (DE)

(73) Assignee: Siemens Aktiengesellschaft, Müchen (DE)

( * ) Notice: Subject to any disclaimer, the term of this patent is extended or adjusted under 35 U.S.C. 154(b) by 0 days.

(21) Appl. No.: 10/774,056

(22) Filed: Feb. 6, 2004

(65) Prior Publication Data

US 2004/0186613 A1   Sep. 23, 2004

(30) Foreign Application Priority Data

Feb. 6, 2003   (DE) ............... 103 04 903

(51) Int. Cl.
*G06F 19/00*   (2006.01)
*G06F 15/16*   (2006.01)
(52) U.S. Cl. .............. 700/169; 700/9; 700/19; 709/200
(58) Field of Classification Search .......... 700/2–7, 700/9, 65, 169, 10, 19, 168; 709/200
See application file for complete search history.

(56) References Cited

U.S. PATENT DOCUMENTS

| 3,668,653 | A | * | 6/1972 | Fair et al. ............... 700/1 |
| 4,294,682 | A | * | 10/1981 | Deczky ................ 204/244 |
| 4,369,563 | A | * | 1/1983 | Williamson ............. 483/7 |
| 4,380,796 | A | * | 4/1983 | Ostby .................. 700/169 |
| 4,943,927 | A | * | 7/1990 | Yarita et al. ........... 700/140 |
| 5,150,288 | A | * | 9/1992 | Imai et al. .............. 700/3 |
| 5,561,770 | A | * | 10/1996 | de Bruijn et al. ....... 709/225 |
| 5,621,672 | A | * | 4/1997 | Kobayashi et al. ....... 700/5 |
| 6,216,157 | B1 | * | 4/2001 | Vishwanath et al. ...... 709/208 |
| 2002/0133634 | A1 | * | 9/2002 | Bieber ................. 709/310 |
| 2003/0195642 | A1 | * | 10/2003 | Ragnini ................. 700/56 |
| 2005/0021839 | A1 | * | 1/2005 | Russel et al. ........... 709/238 |

FOREIGN PATENT DOCUMENTS

| DE | 43 06 032 C2 | 3/1997 |
| DE | 196 25 997 A1 | 1/1998 |
| DE | 199 04 543 A1 | 2/2000 |
| DE | 198 50 502 A1 | 5/2000 |
| DE | 199 10 426 A1 | 10/2000 |
| DE | 199 20 299 A1 | 11/2000 |
| DE | 100 21 838 A1 | 11/2001 |
| DE | 102 43 771.8 | 9/2002 |
| EP | 0 369 188 A2 | 5/1990 |
| EP | 519076 A1 * | 12/1992 |
| EP | 0 903 654 A2 | 3/1999 |
| WO | WO 03/001393 | 1/2003 |

OTHER PUBLICATIONS

The Microsoft Computer Dictionary 1999, 4$^{th}$ edition, Microsoft Press, p. 116.*

(Continued)

*Primary Examiner*—Leo Picard
*Assistant Examiner*—Sean Shechtman
(74) *Attorney, Agent, or Firm*—Henry M. Feiereisen

(57) ABSTRACT

A device for automating and/or controlling machine tools or production machines is described. The device includes at least one computer which is located remote from a machine. The computer operates like a handheld controller and is connected via at least one bus system, which can be wired or wireless, with each machine for unidirectionally or bidirectionally transmitting data and control signals. All control functions of the machine are integrated in the remote controller. This device can automate and/or control machine tools and production machines in a simple and cost-effective manner.

6 Claims, 3 Drawing Sheets

OTHER PUBLICATIONS

"A Small But Powerful Tool", by Seibert, Modern Machine Shop Magazine, Gardner Publications Inc., Oct. 2001.*

"New Borders For Swiss-Type Turning", by Zelinski, Modern Machine Shop Online, Gardner Publications Inc., Sep. 2002.*

Hans B. Kief: NC/CNC Handbunch '95/96, Carl Hanser Verlag München, pp. 416 and following, 1995/1996.

IEE "Visualisierung oder was?" In: iee 46, year 2001, No. 11, pp. 30-32.

* cited by examiner

DEVICE FOR AUTOMATING AND/OR CONTROLLING OF MACHINE TOOLS OR PRODUCTION MACHINES

CROSS-REFERENCES TO RELATED APPLICATIONS

This application claims the priority of German Patent Application, Serial No. 103 04 903.7, filed Feb. 6, 2003, pursuant to 35 U.S.C. 119(a)–(d), the disclosure of which is incorporated herein by reference.

BACKGROUND OF THE INVENTION

The present invention relates to a device for automating and/or controlling machine tools or production machines, and more particularly to a device that allows control of the machine tools or production machines from a remote computer.

Great progress has been made over the past years to exchange data directly between a supervisory computer and machine tools or production machines, wherein production machines also include robots. In order to achieve a high productivity, the machines must include a certain level of intelligence. Productivity can be increased by incorporating suitable automation and control technique. Whereas previously central systems were employed, decentralized systems have begun to dominate whereby an automation and control system residing in each machine is connected via a bus system with the various components of that machine. Productivity can be further increased by using communication devices that connect the machines with each other and with a control system.

A system of the aforedescribed type is shown in "NC-CNC Handbook", Hans B, Kief, 1995/96, Karl Hansa-Verlag, Munich, Vienna, pp. 416 ff. The term DNC used therein refers to an operating mode wherein several NC/CNC machines and/or production machines are connected with a common central computer. According to the DNC concept practiced today, all the control functions of the individual machines are computed entirely on the internal hardware of the respective machine. In earlier DNC systems, each machine performs a core control function, with the central computer preparing or preprocessing the data used by the core control.

It would therefore be desirable and advantageous to provide a simple and cost-effective device for improving the automation and/or control functionality of machine tools or production machines.

SUMMARY OF THE INVENTION

According to one aspect of the invention, a device for automating and/or controlling machine tools and/or production machines includes one or more computers located remote from at least one of the machine tools and/or production machines, wherein the computer(s) include control functions for controlling the machine tools and/or production machines. The device further includes one or more bus systems connecting the computer(s) with each machine tools or production machine. Data and control signals can be transmitted unidirectionally or bidirectionally over the bus system(s). The remote computer is implemented as a manual control device with integrated control functionality.

According to one feature of the invention, the computer can be implemented as a standard personal computer (PC) or a notebook.

According to yet another advantageous feature of the invention, the bus system can be made redundant and secure. This makes possible a particularly high availability of the device.

According to another advantageous feature of the invention, the bus system is implemented as an Ethernet bus system. The Ethernet bus system is known to have a particularly high data throughput rate.

The bus system can also be implemented as a wireless system with secure connections which allows the user to be highly mobile.

Advantageously, the control function of several machines can be processed in parallel on one of the computers. By using only one computer for controlling several machines the device can be implemented particularly inexpensively.

According to another advantageous feature of the invention, the control functions can be distributed for processing over several computers. Since a single computer may be overburdened by centrally processing the control functions of a large number of machines, distributing the various control functions over several computers and processing the control functions can prevent bottlenecks.

According to yet another advantageous feature of the invention, the machine can be provided with an UltraThin-Client™ lacking built-in intelligence. An UltraThinClient™ without built-in intelligence which converts the user input into bus telegrams and receives the incoming telegrams with information to be displayed (e.g., the pixel data for a monitor) can be used in particular for locally controlling the machine.

Advantageously, a central supply unit can be provided for supplying energy to the machines. In other words, the supply units typically associated with each machine can advantageously be combined into a central electric supply unit to reduce costs.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 2 is a block diagram of a software architecture of a computer used with the device of FIG. 1 or FIG. 1a.

DETAILED DESCRIPTION OF PREFERRED EMBODIMENTS

Figure 1:
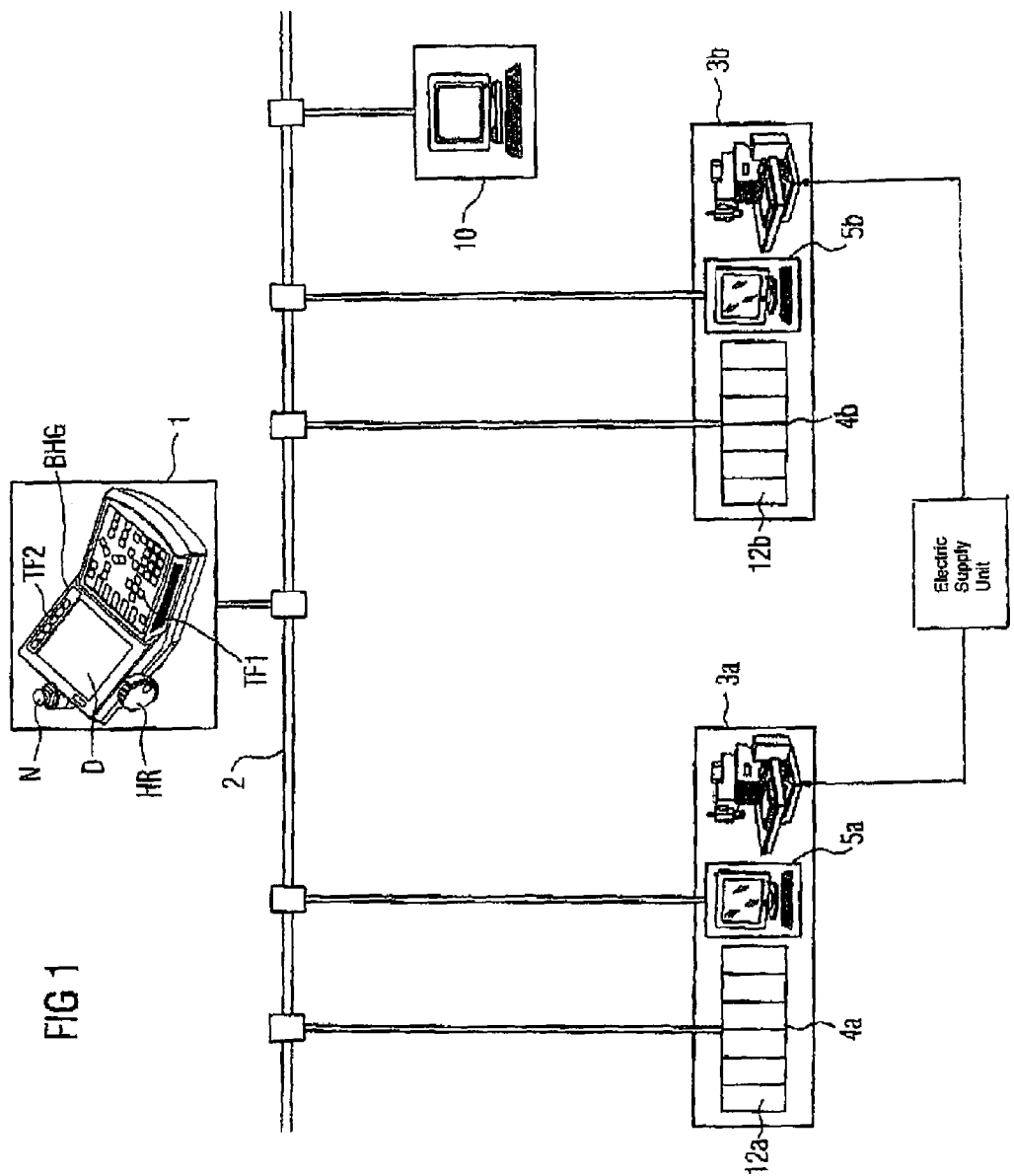
FIG. 1 is a block diagram of a first embodiment of a device according to the present invention.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a block diagram of an automation and control system with a handheld operating device BHG for numerical controllers which is located remote from the machines 3a and 3b and connected via a bus system 2 with the machine 3a and the machine 3b. The handheld operating device BHG is not only capable of providing operating and display functions, but also includes control functionality and can therefore be viewed as a computer 1 that is adapted to the machine environment.

Information can be entered, for example, via the key fields TF1 and TF2, a hand wheel HR and an emergency off-switch N. The data can be visualized on a display D. The handheld operating devices can be designed differently to satisfy ergonomic considerations. An exemplary conventional handheld operating device is commercially available from the company Siemens AG and distributed under the name "Handheld Terminal SINUMERIK HT6".

Unidirectional or bidirectional data and control information is transferred between the computer 1 and the machines 3a and 3b via a bus system 2. An input/output (I/O) unit 4a which can include several I/O modules (only one of the I/O modules 12a is labeled in the figures for sake of clarity) and an UltraThinClient™ 5a are integrated in the machine 3a. Corresponding I/O modules are directly connected with sensors and actuators located in the machine 3a. Sensors can include, for example, rotation encoders, linear transducers, acceleration sensors, switches, contacts and common measurement systems. Actuators include, for example, the drives of the machine. A corresponding I/O unit 4b which includes several associated I/O modules (only one of the I/O modules 12b is labeled for sake of clarity) and an UltraThinClient™ 5b are integrated in the machine 3b. The machines 3a and 3b can in addition include other components, which will not be described here and are of lesser importance for understanding of the invention.

The entire intelligence of the described system, including the control software, for example for controlling the movement of the machine axes, are located in the computer 1. The computer 1 is connected via the bus system 2 and the I/O units 4a and 4b with the sensors and actuators of the machines 3a and 3b, respectively. They sensor signal originating, for example, from the machine 3a is transmitted almost instantaneously to the computer 1, providing the bus system 2 has a sufficiently high data throughput rate, and is further processed by the control functions of the computer 1. Optionally, a corresponding control signal is subsequently transmitted from the computer 1 via the bus system 2 and the I/O units 4a and 4b to the actuators of the machines 3a and 3b.

As mentioned above, the bus system 2 should have a high data throughput rate. In practical applications, an Ethernet bus system has proven to be suitable, whereby for the described applications the bus is advantageously provided in duplicate. One bus is dedicated to operating the sensors and actuators of the machine, which should be capable of operating in real-time, whereas a second bus is dedicated to controlling the system, which requires transmission of a large quantity of data. Since the bus system 2 in the device of the invention is an essential component of the machine control, the bus system 2 should be implemented redundantly to ensure a high level of availability and safety of the data transmission.

If on-site operation is also desired, so-called UltraThinClient™ 5a and 5b can be used which lack built-in intelligence and instead only convert the user input into bus telegrams and receive the incoming telegrams, such display information (e.g., the pixel data for the monitor). Process data can be visualized and changed, or data and programs in the computer 1 can be accessed, by using an optional additional terminal 10 which can be located remote from the machim 3a and 3b and the computer 1 and which can also be implemented an UltraThinClient™ 5a and 5b.

The block diagram shown in FIG. 1 depicts two machines 3a and 3b as well as one computer 1. However, embodiments with an arbitrary number of machines are also feasible. If the computing power of a single computer 1 is insufficient, then several computers can be connected to the bus system 2 for controlling the machines, with the control functions being processed in parallel.

Figure 2:
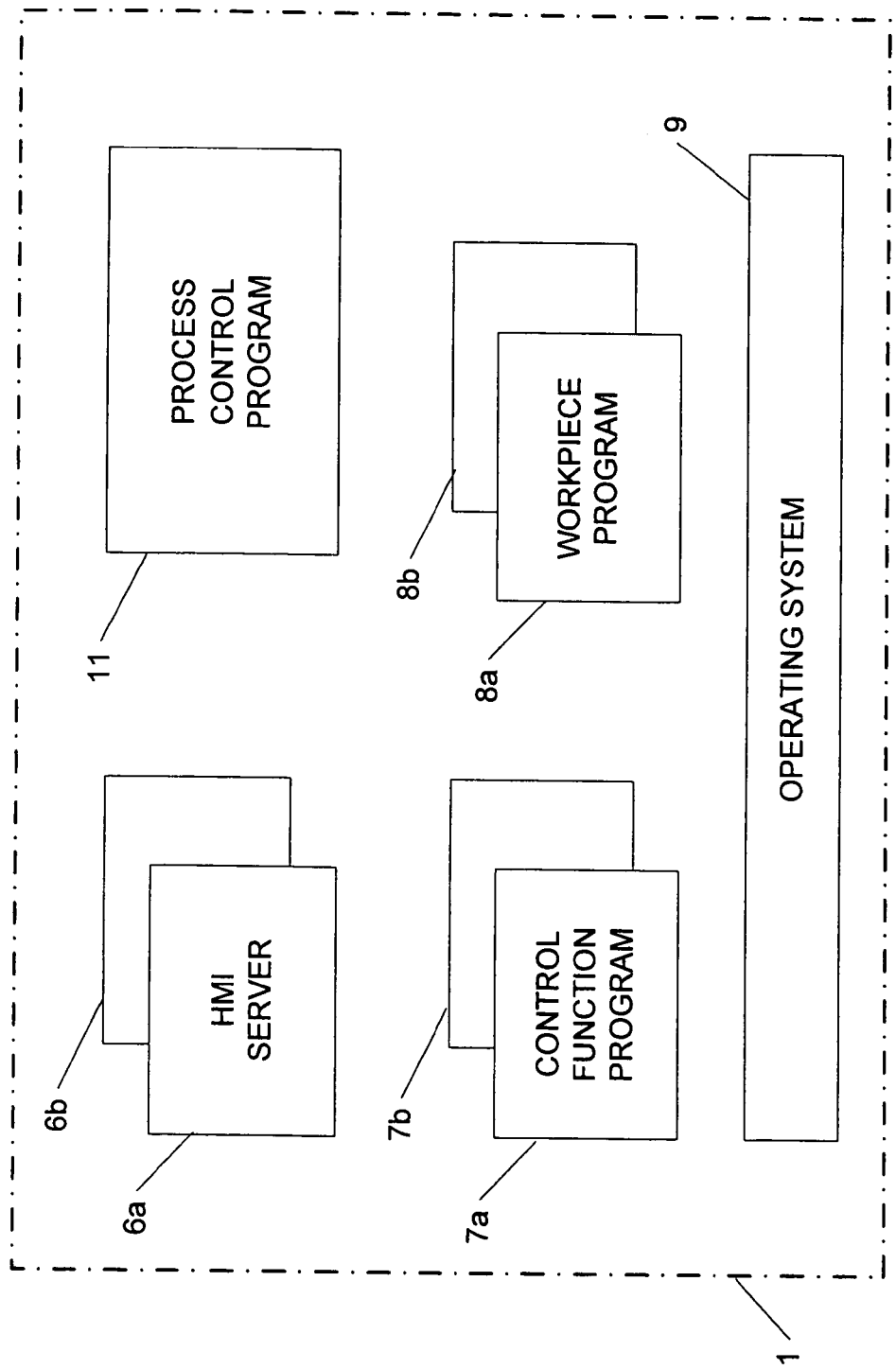

FIG. 2 shows the software structure of the computer 1 in form of a block diagram. The software structure is configured for the two machim 3aand 3b and the computer 1 depicted in FIG. 1. The computer 1 is managed by an operating system 9. For each machine 3a and 3b there adsts in the software a corresponding Human Machine interface (HMI) server 6a and 6b, a corresponding control function program 7a and 7b, and a workpleece program 8aand 8b, respectively. According to the embodiment depicted in FIG. 2, the HMI server 6a, the control function program 7a and the workplece program 8a are associated with the machine 3a depicted in FIG. 1. The HMI server 6b, the control function program 7b and the workplece program 8b are associated with the machine 3b depicted in FIG. 1. A process control program 11 controls a supervisory overall process between the machines 3a and 3b. The HMI server 6a and 6b is configured to manage and control the associated UltraThinClient™ 5a and 5b which is located on the machine 3a and 3b, respectively (see FIG. 1). The axes movements of the machine 3a and/or 3bwhich are controlled, for example, by an NC/PLC (Numerical Control/ Programmable Logic Control) control, are controlled for each machine separately by the corresponding control function programs 7a and 7b, respectively.

A respective workpiece program 8a, 8b, including related data (e.g., tool correction data, tool geometry, etc.), is associated with each machine 3a and 3b. In other words, a corresponding workpiece program 8a is associated with the machine 3b, and a workpiece program 8b is associated with the machine 3b. The workpiece program 8a computes, for example, the desired positions of the machine axes, which are read on the input side by the control function program 7a and then provided to an output. Likewise, the workpiece program 8b computes the desired positions of the machine axes which are read on the input side by the control function program 7b.

Employing a central control and automation device with decentralized I/O units significantly reduces the portion of the automation technology that has to be located within a machine. Accordingly, control boxes located on-site close to the machines can be replaced by smaller units or entirely eliminated. This is achieved by decentralizing the drive components of the machine in the automation and control device, while at the same time combining the electrical supply modules for the different drive components of several machines in a central electric supply device. For example, an intermediate circuit voltage (typically 600V DC) which is typically already generated in each machine from the AC current that powers the drive components, is directly supplied to the machines from the central supply unit instead of a three-phase AC current, as is customary today. Advantageously, the energy which is dissipated, for example, in one machine for braking a spindle, can be regenerated via an electric converter and used directly to operate the other machines.

Figure 1A:
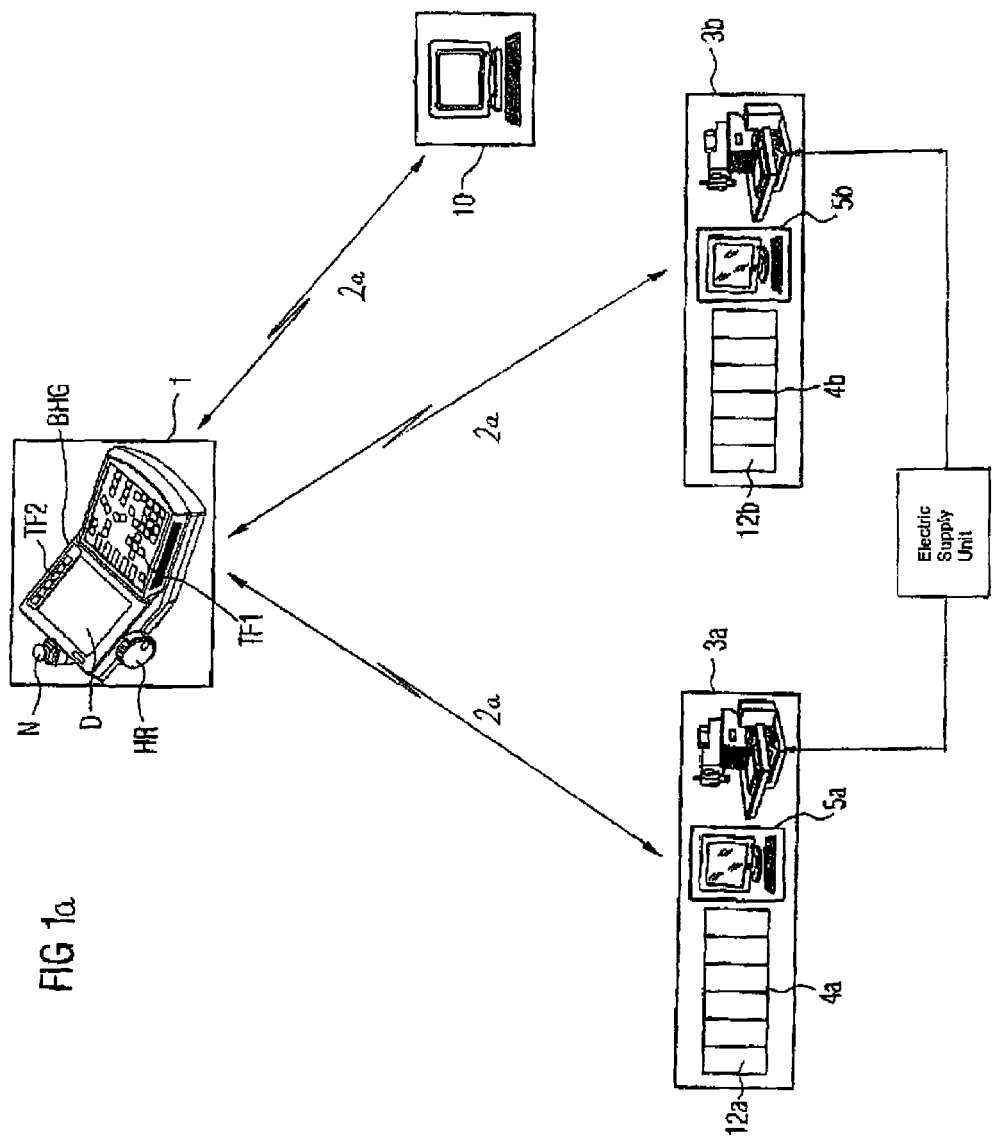
FIG. 1a is a block diagram of a second embodiment of a device according to the present invention.

The bus system 2 is not necessarily a hardwired bus system 2, as depicted in FIG. 1 but can also be implemented as a wireless network 2a, as shown in FIG. 1a. However, wireless networks 2a are known to have more stringent security requirements. For example, a transmission method can be used whereby the signals are securely transmitted, processed and monitored over at least two channels and tested for redundancy and cross-correlated to ascertain plausibility, as described in DE 199 20 299.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A device for controlling a plurality of machine tools or production machines, comprising:
   one handheld device located remote from the plurality of machine tools or production machines and producing control signals for controlling operation of the plurality of machine tools or production machines;
   at least one respective ultrathin client included in each of the machine tools or production machines for converting the control signals from the one handheld device into bus telegrams which include data for controlling drive components for machine axes of the plurality of machine tools or production machines, said least one ultrathin client lacking built-in intelligence; and
   at least one bus system connecting the one handheld device with the at least one ultrathin client to transmit the data and the control signals between the one handheld device and the at least one ultrathin client, wherein the entire intelligence, including the control software for controlling the movement of the machine axes, is located in the one handheld device, wherein for each of the oluraiitv of machlne tools or production machines there exists in the control software a control function program, wherein the machine axes movements of each machine tool or production machine are controlled separately by a corresponding one of the control function programs.

2. The device of claim 1, wherein the at least one bus system is configured as a redundant and secure bus system.

3. The device of claim 1, wherein the at least one bus system is implemented at an Ethernet bus system.

4. The device of claim 1, wherein the at least one bus system comprises a secure wireless connection.

5. The device of claim 1, and further including a central electric supply unit that supplies energy to the machine tools or production machines.

6. A device for controlling a plurality of machine tools or production machines, comprising:
   one handheld device located remote from the plurality of machine tools or production machines and producing control signals, said control signals being the only signals that control the operation of the plurality of machine tools or production machines;
   at least one respective ultrathin client included in each of the machine tools or production machines for converting the control signals from the one handheld device into bus telegrams which supply data for controlling machine axes of the plurality of machine tools or production machines, said ultrathin client lacking built-in intelligence; and
   at least one bus system connecting the one handheld device with the at least one ultrathin client to transmit the control signals from the one handheid device to the at least one ultrathin client and transmit data from the at least one ultrathin client to the one handheld device, wherein the entire intelligence, including the control software for controlling movement of the machine axes, is located in the one handheld device, wherein for each of the plurality of machine tools or production machines there exists in the control software a control function program, wherein the machine axes movements of each machine tools or production machine are control separately by a corresponding one of the control function porgrams.

* * * * *

UNITED STATES PATENT AND TRADEMARK OFFICE
CERTIFICATE OF CORRECTION

PATENT NO. : 7,035,710 B2 Page 1 of 1
APPLICATION NO. : 10/774056
DATED : April 25, 2006
INVENTOR(S) : Gerold Balling It is certified that error appears in the above-identified patent and that said Letters Patent is hereby corrected as shown below:

Cover Page (73) Assignee: change "Müchen" to -- München--

Column 5, line 43: change "oluraiity" to --plurality--

Column 6, line 14: change "too1s" to --tools--

Column 6, line 41: change "control" to --controlled--

Signed and Sealed this

Fifteenth Day of August, 2006

JON W. DUDAS
*Director of the United States Patent and Trademark Office*